United States Patent
Grau et al.

(10) Patent No.: US 9,034,471 B2
(45) Date of Patent: May 19, 2015

(54) POWDER COATING COMPOSITIONS AND A METHOD FOR COATING A SUBSTRATE, SUCH AS A THERMALLY SENSITIVE SUBSTRATE

(75) Inventors: Enrique Grau, Barcelona (ES); Lluis Casadevall, Santa Maria de Palautordera (ES)

(73) Assignee: Arkema Coatings Resins S.A.U., Madrid (ES)

( * ) Notice: Subject to any disclaimer, the term of this patent is extended or adjusted under 35 U.S.C. 154(b) by 21 days.

(21) Appl. No.: 13/821,690

(22) PCT Filed: Sep. 6, 2011

(86) PCT No.: PCT/EP2011/065392
§ 371 (c)(1),
(2), (4) Date: Mar. 8, 2013

(87) PCT Pub. No.: WO2012/034901
PCT Pub. Date: Mar. 22, 2012

(65) Prior Publication Data
US 2013/0230728 A1 Sep. 5, 2013

(30) Foreign Application Priority Data

Sep. 14, 2010 (EP) .................................... 10380116
Oct. 27, 2010 (EP) .................................... 10013997

(51) Int. Cl.
| | |
|---|---|
| C08L 75/14 | (2006.01) |
| B32B 27/10 | (2006.01) |
| C08G 18/28 | (2006.01) |
| C08G 18/32 | (2006.01) |
| C08G 18/67 | (2006.01) |
| C08G 18/79 | (2006.01) |
| C09D 175/04 | (2006.01) |
| C09D 175/16 | (2006.01) |

(52) U.S. Cl.
CPC .......... *C09D 175/04* (2013.01); *C08G 18/2825* (2013.01); *C08G 18/3206* (2013.01); *C08G 18/672* (2013.01); *C08G 18/792* (2013.01); *C08G 2150/20* (2013.01); *C09D 175/16* (2013.01)

(58) Field of Classification Search
USPC ................ 428/425.8, 423.1, 425.1; 524/590; 522/174
See application file for complete search history.

(56) References Cited

U.S. PATENT DOCUMENTS

| 5,068,305 A | 11/1991 | Meixner et al. | |
|---|---|---|---|
| 6,525,161 B1 * | 2/2003 | Hall | ................................ 528/49 |
| 6,780,897 B1 * | 8/2004 | Blum et al. | ................... 522/110 |

FOREIGN PATENT DOCUMENTS

EP 0 783 534 B1 9/1998

* cited by examiner

Primary Examiner — Thao T. Tran
(74) Attorney, Agent, or Firm — Lynn B. Morreale

(57) ABSTRACT

The invention relates to a powder resin with amp from 60 to 110° C., and a particle size from 10 to 250 μm, which comprises the reaction product of a reactive composition comprising: a) an isocyanate component comprising a polyisocyanate with functionality of at least 2, b) an alcoholic component, comprising: b1) at least one polyol with OH functionality from 2 to 4, b2) a monoalcohol component comprising: b2.1) a monoalcohol, bearing an ethylenic unsaturation b2.2) a saturated alcohol selected from the group of fatty alcohols, b2.3) optionally, an additional saturated monoalcohol from non fatty monoalcohols the molar ratios of OH functional groups, of the said alcoholic components b2.2) (possibly b2.3)) and b2.1) being defined so that the OH molar ratio of b2.2)/b2.1) or of [b2.2)+b2.3)]/b2.1) ranges from higher than 0.25 to 2, with the proviso that: the resulting said powder resin does bear at least one urethane unit with branched structure resulting from the reaction of an isocyanate component a) with a polyol component b), with said component a) having an average functionality higher than 2 or otherwise (if not higher than 2) the said component b1) having an average functionality higher than 2, with the resulting resin having no any crosslinked structure and being soluble in an organic solvent. The invention does also relate to a powder coating composition comprising the said resin and the resulting coatings and coated substrates for protective or decorative uses.

23 Claims, No Drawings

POWDER COATING COMPOSITIONS AND A METHOD FOR COATING A SUBSTRATE, SUCH AS A THERMALLY SENSITIVE SUBSTRATE

CROSS-REFERENCE TO RELATED APPLICATIONS

This application is a national stage application under 35 U.S.C. §371 of PCT/EP2011/065392, filed Sep. 6, 2011, which claims benefit to EP application EP 10380116.3, filed on Sep. 14, 2010, and EP application EP 10013997.1, filed Oct. 27, 2010, all of which are hereby incorporated by reference.

FIELD OF THE INVENTION

The present invention relates to improved powder coating compositions based on ethylenically unsaturated, preferably (meth)acrylated poly- or oligo-urethanes also defined as urethane acrylates, and methods of coating substrates using such urethane acrylates compositions and more particularly to the semi-crystalline ones.

BACKGROUND OF THE INVENTION

The Powder Coatings technology for metal substrates is a well established process consisting in the application of a powdered fusible material to a substrate, heating the powder in contact with the substrate, melting and flow of that powder, usually incurring in some chemical reaction, and finally cooling the resultant to form a solid coating.

The coating material may simply comprise a film-forming thermoplastic material or may comprise a reactive material, as an epoxy resin together with a curing agent, so that during the course of melting and reflowing, reaction occurs to cure the material in situ on the substrate. In any event, powder coating materials are generally such that they have to be melted and at relatively high temperatures, 150° C. or more. As a result, powder coating processes are generally not suitable for the coating of heat-sensitive materials such as wood or plastics material. In order to coat such materials, it would be necessary to have a product which had a relatively low melting temperature, e.g. below about 120° C., whilst at the same time being solid at ambient temperature, which material could subsequently be cured in situ on the substrate during the melting/reflowing stage or afterwards.

The resins used in coatings can have a very different origin: polyester, epoxy, isocyanates, etc. Developed binders as amorphous polyester acrylates resins, for example, can not fulfill the requirements due to their high Tg. Urethane acrylates (UA), in contrast, have a wide versatile chemistry that can be used to coat these materials.

For example, EP 783 534 discloses a powder coating composition comprising a solid ethylenically unsaturated resin having a melting point from 60 to 120° C. and obtained by reacting a polyisocyanate with at least stoechiometric amount of an alcoholic component based on an ethylenically unsaturated (acrylate or methacrylate) monoalcohol and at least one saturated monoalcohol and optionally at least a monomeric polyol. In spite of their improvements with respect to prior art, these powder compositions require still improved processability, storage stability and an improved compromise between low viscosity and good flow and impregnability from one side and antisagging resistance on the other side with high enough melting point and improved weathering and outdoor resistance and mechanical performances for better suitability for the coating at relatively lower temperatures of thermally sensitive substrates like wood and plastics. In spite of these performances, they do still need to be improved, particularly in terms of hardness and chemical resistance and weathering of the resulting coating.

EP-A-0 410 242 discloses a powder coating composition which comprises the reaction product of one or more organic polyisocyanates with one or more monovalent alcohols containing (meth)acryloyl groups, and one or more compounds which are free from (meth)acryloyl groups and contain at least two isocyanate-reactive groups. The viscosities of these products are generally not suitable for thermally sensitive substrates due to a high viscosity which does require heating for lowering such a viscosity.

Powder coating application should in fact deal with a compromise: melting, flowing and curing proceed more or less at the same time. Moreover, the high temperatures needed to cure, make standard powder coating systems difficult to coat heat-sensitive materials such as wood or plastics. Storage conditions are a determinant restriction too, because the said powder coating compositions should be stable under storage conditions.

Consequently, with respect to this closest prior art, there is a need for improvements in terms of processability, storage stability and of compromise between low viscosity, good flow and impregnability from one side and antisagging resistance on the other side. This is obtained with a lower enough melting point for a better suitability of the coating at relatively lower temperatures, for thermally sensitive substrates like wood and plastics.

It has now been found, in accordance with the present invention, that useful solid ethylenically unsaturated powder resin materials, having relatively low melting point and suitable for use in powder coating compositions, particularly for heat-sensitive substrates, can be prepared by reacting a polyisocyanate with an alcoholic component having a specific composition.

The first subject of the invention relates to a powder resin comprising the reaction product of a polyisocyanate with a specific alcoholic component comprising besides a polyol, selected from diols, triols or tetrols, a specific combination of a saturated and of an unsaturated monoalcohol.

The second subject concerns a powder coating composition comprising the said powder resin.

Another subject concerns a powder coating composition comprising at least one powder resin of the invention.

It is also part of the invention a coating resulting from the cure of the said powder coating composition.

Another subject is related with the coated substrates resulting from the said coating composition.

Finally, specific uses of the powder resin of the invention are also part of the invention.

DETAILED DESCRIPTION OF CERTAIN EMBODIMENTS OF THE INVENTION

So, the first subject of the invention relates to a powder resin with a melting point ranging from 60 to 110° C., preferably from 70 to 100° C. and with a particle size from 10 to 250 μm (microns), which powder resin comprises the reaction product of a reactive composition comprising:
a) an isocyanate component comprising at least one polyisocyanate with a functionality of at least 2, preferably from 2 to 4 and more preferably 2 to 3
b) an alcoholic component, preferably with an average OH functionality of 1.2 to 4, more preferably 1.2 to 3, comprising:
b1) at least one polyol with OH functionality from 2 to 4, preferably from 2 to 3, optionally bearing at least one ethylenic unsaturation,
b2) a monoalcohol component comprising:
b2.1) at least one monoalcohol, bearing at least one ethylenic unsaturation b2.2) at least one saturated alcohol (monoalcohol) selected from: the group of fatty alcohols, preferably from linear fatty alcohols having a chain length from $C_{12}$ to $C_{26}$ and more preferably from $C_{16}$ to $C_{24}$ and optionally, b2.3) at least one additional saturated monoalcohol, selected from the group of the non fatty monoalcohols, preferably from etherified or esterified polyalkylene glycols or polyols or from etherified or esterified oligoether polyols (preferably diols) or from lower than or equal to $C_{10}$ alkanols, the molar ratios of OH functional groups of the said alcoholic components b2.2), b2.3) and b2.1) being defined so that the OH molar ratio of b2.2)/b2.1) or of [b2.2)+b2.3)]/b2.1) if b2.3) is present, ranges from higher than 0.25 to 2 and preferably from 0.3 to 1.0, with the proviso that:

the (resulting) said powder resin does bear at least one urethane unit with branched structure resulting from the reaction of at least one polyisocyanate a) or of at least one polyol b1), with either, said component a) having an average functionality higher than 2 or otherwise (if not higher than 2 for component a)) with said component b1) having an average functionality higher than 2, and with the resulting resin has no any crosslinked structure and is soluble in at least one organic solvent.

The non-crosslinked character of the powder resin is enabled by specifically selecting the reaction conditions in terms of controlled average functionality and of proportions of reactants and of global NCO/OH ratio, in order to avoid any gelling (or gelation) by any crosslinking. These conditions are well-known to a man skilled in the art of polymer chemistry and of polycondensation reactions and can be predicted by a man skilled in the art according to the Macosco-Miller relation governing these conditions, according to Macromolecules, Vol. 9, pp 199-211 (1976).

According to a first preferred possibility of the invention, the said powder resin is the result from the reaction (reaction product) of at least one isocyanate a) having a functionality (means average functionality) higher than 2. According to another possibility, the said urethane unit results from the reaction of at least one polyol b1) having a functionality (or average functionality) higher than 2. Average functionality for polyol means in OH. In fact, this does mean that preferably the average functionality of the reactants a) and b) (average of a)+b)) is higher than 2 but in conditions as predictable according to Macosko's relation, which conditions do enable avoiding any gelation or crosslinking with the said powder resin still being soluble in at least one organic solvent. Average functionality means average number of reacting functions by reacting molecules (including alcohols+isocyanates)=total number of functions (OH+NCO) divided by the total number of reacting molecules in a)+b).

Consequently, the said powder resin of the present invention may have the said urethane branched unit structure resulting from the reaction of at least one isocyanate a) having a functionality higher than 2, preferably triisocyanates and more preferably aliphatic and cycloaliphatic triisocyanates, with at least one polyol b1) having a functionality of 2, being a diol or it may result from the reaction of at least one polyol b1) having a functionality higher than 2, preferably triol and/or tetrol, with a polyisocyanate a) having a functionality of 2, preferably aliphatic and cycloaliphatic diisocyanates.

Suitable polyisocyanates for use in the preparation of the said oligo- or poly-urethanes include tetramethylene diisocyanate, hexamethylene diisocyanate, dimer acid diisocyanate, diethylbenzene diisocyanate, decamethylene 1,10 diisocyanate, cyclohexylene 1,4 diisocyanate, 2,4 and 2,6 tolylene diisocyanate (TDI), diphenylmethane-4,4'-biphenyldiisocyanate, 3,3,'-dimethoxy-4,4,'-biphenyldiisocyanate, 3,3'-dimethyl-4,4,'-biphenyldiisocyanate phenylene diisocyanate, 4,4'-biphenyldiisocyanate, 1,5 naphtalene diisocyanate, dianisidine diisocyanate, toluidine diisocyanate, m-xylylene diisocyanate, tetrahydronaphatalene diisocyanate, methylene di(cyclohexyl) isocyanate, isophorone diisocyanate, tri methyl hexamethylene diisocyanate and tetra methylene xylene diisocyanate, triisocyanates like the trimer of HMDI or hexamethylene diisocyanate triisocyanate resulting from HMDI like Desmodur N3300, trimer of TDI like Desmodur IL, tetraisocyanates like neopentyl tetra isocyanate. Preferred are aliphatic and cycloaliphatic di- or tri-isocyanates, the diisocyanates being preferred when polyol b1) has a functionality (or average functionality if mixture) higher than 2 and triisocyanates when the said polyol b1) has a functionality (or average functionality when mixture) of 2 or less, in the context of the above definitions of b1).

The reaction between the polyisocyanate a) and the alcoholic component b) (comprising monoalcohol b2) and polyol b1)) may be suitably carried out in the presence of a catalyst. As such a suitable catalyst, the following ones may be mentioned:

(a) tertiary amines such as bis(dimethyl amino ethyl) ether, trimethyl amine, triethyl amine, N-methyl morpholine, dimethyl ethanol amine, N.N.N',N'-tetramethyl-1,3-butane diamine, triethanol amine, 1,4-diazabicyclo(2.2.2) octane and pyridine oxide, (b) tertiary phosphines such as trialkyl phosphines and dialkyl benzyl phosphines, (c) strong bases such as the hydroxides, alcoholates and phenolates of alkali metals and alkaline earth metals, (d) metal salts of strong acids such as ferric chloride, antimony trichloride and bismuth nitrate, (e) chelates, such as those which can be obtained from acetyl acetone, benzoyl acetone, trifluoroacetyl acetone, ethyl acetoacetate, salicylaldehyde imine, and from metals such as beryllium, magnesium, zinc, cadmium, lead, titanium, zirconium, tin, arsenic, bismuth, chromium, molybdenum, manganese, iron, cobalt and nickel, (f) alcoholates and phenolates of metals, such as $Ti(OR)_4$, $Sn(OR)_4$, $Sn(OR)_2$, and $Al(OR)_3$, in which R is an alkyl or aryl group, (g) the salts of organic acids and of metals, such as alkali metals and alkaline earth metals, aluminum, tin, lead, manganese, cobalt, nickel and copper for example sodium acetate, potassium laurate, calcium hexanoate, stannous acetate, stannous octoate and stannous oleate, lead octoate, manganese and cobalt naphtenates; and (h) iron and cobalt metal carbonyls and organometallic derivatives of tetravalent, tin, of trivalent and pentavalent arsenic, of antimony and of bismuth; particularly preferred are the salts of dialkyl tin carboxylic acids, such as dibutyl tin diacetate, dibutyl tin dilaurate, dibutyl tin maleate, dilauryl tin diacetate, dioctyl tin diacetate, dibutyl tin bis(4methylanlino benzoate), dibutyl tin bis (6-methylamino caproate), trialkyl tin hydroxides, dialkyl tin oxides, dialkyl tin dialcoxides and dialkyl tin dichlorides.

Said catalyst is generally used at a rate of from 0.01 to 2% by weight of the polyisocyanate.

The molecular weight of the final solid ethylenically unsaturated powder resin is from 500 to 3.000, preferably from 500 to 1.500.

For some applications, it is desirable that the oligo-polyurethanes (oligo-urethane will be used as meaning both notions for the rest of the disclosure) are clear, with sufficient weathering resistance and reduced yellowing index. Aliphatic and cycloaliphatic alcoholic b) and isocyanate a) structures (or components) are most preferred for this purpose.

The ethylenically unsaturated solid material forming a part of the powder coating composition, in accordance with the invention, is in a powdered form, e.g. has an average particle size from 10 to 250 μm, especially from 10 to 90 μm. In addition to the particulate, ethylenically unsaturated material, a powder coating composition in accordance with the invention preferably further comprises a curing system for the ethylenically unsaturated material.

It is also most often preferred that the powdered solid material of the invention has a viscosity (at application temperature) in the range from 0.1 Pa.s to 3.5 Pa.s, most preferably 1.0 Pa.s to 2.2 Pa.s.

According to a particular preference, the said powder resin is a semi-crystalline powder resin.

More preferably, in the powder resin of the invention, the molar ratios of the alcoholic components are defined as follows:

b2.1)/b): 25-75%
b2)/b): 50-90%
b1)/b): 10-30%

The ethylenically unsaturated monoalcohol b2.1) is preferably selected from (meth)acrylic, and/or vinylic and/or allylic alcohols and more preferably from hydroxy-alkyl (meth)acrylates, or from monoalcohols which are partly (meth)acrylated polyols of (initial) functionality from 2 to 4, or from allylic alcohols or from hydroxy alkyl unsaturated ester derivatives of a diacid half ester, particularly of maleic or fumaric acid half esters. The saturated alcohol b2.2) comprises at least one fatty alcohol, preferably linear fatty alcohol, which may be selected from $C_{12}$ to $C_{26}$ alcohols, more preferably from $C_{16}$ to $C_{24}$ monoalcohols, like octadecanol or from ester alcohol derivatives of the corresponding fatty acids. The said optional additional saturated alcohol b2.3) may be a non fatty alcohol or an ester alcohol or ether alcohol, and may be selected from esterified or etherified polyalkylene glycols or polyols or from etherified or esterified oligoether polyols, preferably diols, with a chain length lower than $C_{10}$, for example a mono-etherified or mono-esterified dihydric aliphatic alcohol, or dihydric polyalkylene glycol or dihydric oligoether. Typical etherified dihydric alcoholic materials which may be used as monohydric alcoholic component include propylene glycol methyl ether, dipropylene glycol methyl ether, ethylene glycol butyl ether, diethylene glycol butyl ether, tripropylene glycol butyl ether and propylene glycol phenyl ether.

The at least one polyol b1) of functionality from 2 to 4 of the polyol component b) is preferably selected from diols and/or triols and/or tetrols, more preferably from triols and/or tetrols but under the condition that:

when the polyisocyanate is di-functional, then the said polyol b1) is selected from at least one diol and/or triol and/or tetrol, preferably triol and/or tetrol with an average polyol b1) functionality higher than 2 (mixture with necessary presence of a triol and/or a tetrol), and when the said polyisocyanate is tri or tetra-functional or a mixture of di-, tri- and tetra-isocyanate, with an average functionality higher than 2, then, the said polyol b1) is selected from diols, or from a mixture of polyols but when the average functionality of the OH reactive groups of b1) is higher than 2 with the proportions and functionalities and related conversion, of the corresponding reactants a) and b) fulfilling the Macosko-Miller's relation, in order to assure a reaction (product) without any crosslinked structure or any gelation problem. In fact, in this specific case, the powder resin of the invention has a branched structure without any presence of a crosslinked structure.

The expression "without any crosslinked structure" according to the present invention, with absence of gelation, means that the Macosko-Miller's relation is fulfilled. This relation is a well-known relation to a man skilled in the art (see Macromolecules, vol. 9, pp 199-211, in 1976). One first possibility is to have an isocyanate a) with functionality (or average functionality if a mixture) of at most 2 and a polyol b1) with a functionality (average functionality if a mixture) higher than 2, preferably of 3, with fulfilling by the reactants a) and b) of the Macosko-Miller's relation.

According to a particular case, the powder resin of the invention is obtained with polyol b1) being at least one triol and/or tetrol and the said polyisocyanate a) being a diisocyanate or otherwise, the said polyol b1) being a diol and the said polyisocyanate being at least one tri and/or tetra-functional isocyanate, with the average functionality of the reactive groups from a) and b) (average on a)+b)) being higher than 2 and with the proportions and functionalities and related conversions, of the said reactants a) and b) fulfilling the Macosko-Miller's relation.

According to another preferred option, said polyol b1) has a functionality of 2 and is selected from isosorbide diols and preferably with said isocyanate a) having a functionality higher than 2 and more preferably with said isocyanate being a triisocyanate, like HDT.

One preferred powder resin is based on an isocyanate a) having a functionality (average functionality) higher than 2, preferably 3 and more preferably being HDT (hexamethylene diisocyanate trimer triisocyanate) and a polyol b1) being a diol preferably selected from isosorbide diols. These higher Tg resins give even more improved performances in processability, hardness and yellowing resistance.

In fact, the finally obtained powder resin is a branched powder resin which is completely soluble when dissolved in an organic diluent such as cyclohexanone, which condition does mean that the said reaction conditions (proportions and corresponding functionalities) do not at all lead to any crosslinked resin structure, the final product being a solvent-soluble resin or a gel-free resin or a resin free of crosslinked structure.

Polyols which may be used as b1) polyols include for example diols from: saturated aliphatic diols such as ethylene glycol, diethylene glycol, triethylene glycol, propylene glycol, dipropylene glycol, tripropylene glycol, butylene glycol, neopentyl glycol (NPG), 1,3- and 1,4-butane diols, pentaethylene glycol, 1,6-hexanediol, 2-methyl-1,3, propanediol, 2 ethyl 1,3 hexanediol, Bisphenol, isosorbide diols. Isosorbide diols are among the preferred b1) polyols. As triols for polyols b1), we may cite glycerol, and 1,1,1-trimethylolpropane (TMP), glycerin or cycloaliphatic polyols, particularly diols, preferably cycloaliphatic diols like isosorbide diols. Cycloaliphatic polyols enable higher Tgs for the resulting powder coating. As suitable polyols with higher functionality, we may cite pentaerythritol, dipentaerythritol, erythritol, sorbitol.

According to a specific embodiment of the invention, the powder resin of the invention may comprise, in addition to the reaction product of components a) and b) as defined above according to the invention, at least a second powder resin, different from the reaction product of a) and b) as defined above, according to the invention. In fact, in this case, the resin of the invention comprises:
- a first resin, which is the reaction product of a) and b), with said alcoholic component b) comprising b1) and b2) as defined above, and with b2) further comprising monoalcohols b2.1) and b2.2) as defined above, and
- a second resin, which is the reaction product of a) with b) as defined above but, in this case, with component b) and more precisely component b2), being free of the said saturated monoalcohol b2.2).

More particularly, the said at least second resin is an amorphous reactive resin, which may be obtained as the reaction product of components a) and b) as defined above but with the exception (or difference) that the component b2) is free from a saturated monoalcohol b2.2). In such a case, the first resin, which is the reaction product of a) and b) according to the invention, is present in the said resin mixture at a weight content of 60 to 90% and preferably of 65 to 75%, with the said second resin being present at 10 to 40% and preferably at 25 to 35% by weight.

The said powder resin, according to this specific embodiment of the present invention, resulting from a first powder resin and from a second amorphous powder resin, may be obtained by a process comprising the following steps:
i) preparation of a resin resulting from the polycondensation (polyaddition) reaction between said components a) and b) as defined above, with said component b) comprising components b1) and b2), and with said component b2) comprising components b2.1) and b2.2), as defined above according to the invention
ii) addition of the reactive composition a) and b) (with b) comprising b1) and b2.1) as defined above and without component b2.2)) which composition is the precursor of the said amorphous second resin
iii) in situ post reaction of the said reactive composition of step ii) in the presence of the first resin of step i).

The second subject of the invention relates to a powder coating composition comprising at least one powder resin according to the invention, as disclosed above.

More particularly, such a coating composition may be either a paint or a varnish or a pigmented or a non-pigmented protective and/or a decorative coating. A more preferred characteristic of such a coating composition based on the powder resins of the present invention is that it is suitable for a low temperature cure.

It may further comprise at least one free radical initiator system which may comprise at least one peroxide suitable for heat-curable coatings and/or at least one initiator suitable for radiation-curable coatings and preferably for UV-curable or photocurable coatings. Preferably, the powder coatings compositions according to the present invention are radiation curable coatings compositions and can be UV-curable and/or photocurable and/or EB (Electron-Beam)-curable coatings compositions. At least, one photoinitiator is required in such a case excepted if the composition is EB-curable.

In accordance with one embodiment of the invention, the curing system may comprise a thermal free radical initiator, generating radicals of the peroxide type or like, optionally together with one or more promoters or accelerators therefore. Suitable examples of such free radical generating initiators include 1,1-bis(t-butylperoxy)-3,5,5-trimethylcyclohexane, 1,1-bis(t-butylperoxy)-cyclohexane, t-butylperoxyisopropyl carbonate, t-butyl perisononanoate, t-butyl peracetate, t-butyl perbenzoate, dicumyl peroxide, di-t-butyl peroxide, t-butyl hydroperoxide, t-butyl perneodecanoate, diisooctanoyl peroxide, dibenzoyl peroxide, and azo bis (isobutyronitrile).

Preferably, the free radical initiator system is selected in such a way so that the powder can melt and reflow prior to curing. This makes it possible to obtain a well leveled film, in contrast to conventional epoxy/acid powders, in which curing is effected during melting and reflowing, leading to an orange peel effect.

In accordance with another embodiment of the invention, particularly in the case of radiation-curable coating compositions, the said composition may comprise a curing system which may further comprise one or more photoinitiators, sensitive to ultraviolet light, optionally together with sensitizer therefore. By operating with such a system, the coating composition may be allowed to cool and solidify after melting/reflowing and then be subjected to appropriate irradiation to cure the coating. Examples of suitable photoinitiators include benzyldimethyl ketal, trimethyl benzophenone, isopropyl thioxanthone, ethyl 4-dimethylamino benzoate, benzophenone, 2-chloro and 2-hydroxy-2-methyl-1-phenyl propanone, 4-benzoyl-4'-methyl-diphenyl sulphide, 1-hydroxycyclohexyl-acetophenone, and 2-ethyl-hydroquinone. Examples of suitable sensitizers include 4,4-dimethyl amino-benzophenone, triethanol amine, N-methyl-diethanolamine, 2-(butoxy)ethyl, 4-dimethyl amino benzoate and acrylated amines.

The powder coatings compositions, as defined according to the invention, may also be curable by a dual cure system, comprising firstly a thermally activated curing system as defined above and secondly a photoinitiator system for additional UV-curing or photocuring after a first thermal cure step.

Consequently, the said powder coatings compositions may be cured by a thermal cure free radical system or by a radiation cure system like EB, UV, or photo curing system or by a dual cure system, which is a combination of both cures, the first cure being a thermal cure and the second one being a radiation cure like EB and/or UV and/or Photo cure.

More particularly, a powder coating dual cure process for coating a substrate and curing the coating may comprise the following steps:
i) applying a powder coating composition, in accordance with the invention, to the substrate,
ii) heating the composition to melt it and reflow it on the substrate, and
iii) thermal cure by free radical polymerization after the melting/reflowing step, followed by
iv) an additional curing step, by subjecting the thermally cured coating on the substrate, to ultraviolet or electron beam radiation.

According to a more specific embodiment of the invention, the curing system may be absent and curing of the solidified coating on the substrate may be effected by electron beam radiation.

In this case, it is not required any initiator system, given that it is curable by high energy radiation such as electron-beam (EB) radiation.

It is also part of the present invention, a coating obtained by any curing of a powder coating composition as disclosed above, according to the present invention. Such a coating may be a paint or a varnish or a pigmented or a non pigmented protective and/or decorative coating. More specifically, a protective coating may be an anticorrosion coating suitable for metal or may be a protective coating for plastics or for wood or for wood composites or cardboards and/or assemblies of them.

Another subject of the present invention is a coated substrate coated with a coating as defined above according to the present invention. The said substrates are specifically heat-sensitive substrates and they may be selected from wood, wood composites, plastics, paper, cardboards and assemblies of them. More generally, the said substrates may be selected from: wood, wood composites, paper, cardboards, plastics, metal, synthetic composites, or assemblies of them.

The uses of the powder resins of the present invention are another part of the invention, more particularly their uses in protective and/or decorative coatings and preferably in paints or varnishes, or UV-curable toners. Suitable substrates for such a use are selected from: wood, wood composites, paper, plastics, assemblies of the said substrates between them or with other substrates like metal.

Depending on their final destination and their technical functionality, the use of the said powder resins may be for: automotive coatings, gel coats, "in mold" compounds coatings, abrasion resistant coatings and preferably floor coatings or fire resistant coatings.

In addition to the basic components noted above, powder coating compositions in accordance with the invention may contain, and often do contain, at least one other ingredient particularly selected from colorants, pigments or dyestuffs, flow aids, anti-cissing agents, flexibilizers, degassing agents and inorganic fillers.

In order that the invention may be well understood, the following examples are given by way of illustration only. Unless stated otherwise, all amounts are expressed by weight.

EXPERIMENTAL PART

TABLE 1

Raw materials used and references

| Raw materials Ref. | Chemical nature | Purity | Supplier | Function |
|---|---|---|---|---|
| Desmodur44MC | Diphenyl methane-4,4' diisocyanate | >99.5% | BAYER | Isocyanate a) |
| Rocryl 420 | Hydroxy ethyl acrylate (HEA) | >98% | Rohm & Haas | Alcohol b2.1) |
| TNPP | Trisnonyl phenyl phosphite | >95% | Betaquimica | Stabilizer |
| Ionol | Butyl hydroxy toluene (BHT) | >98% | Oxiris | Stabilizer |
| DBTDL | Dibutyl TinDilaurate (DBTDL) | >98% | Reagens | Catalyst |
| DPGME | Dipropylene glycol methyl ether | >99% | Merck | Alcohol b2.2) |
| Stenol | Octadecanol | >95% | Cognis | Alcohol b2.2) |
| Stenol L18-22 | Fatty alcohol $C_{18-22}$ | >95% | Cognis | Alcohol b2.2) |
| TMP | Trimethylol propane (TMP) | >90% | Perstorp | Polyol b1) |
| Tolonate HDT | Trimer of HMDI (HDT) | >99.9% | Perstorp | Isocyanate a) |
| NPG | Neopentyl glycol | >95% | Basf | Polyol b1) |
| Isosorbide Polysorb P EXP | Dianhydro Sorbitol | 99.5% | Roquette | Polyol b1) |
| Novadelox 27 | Benzoyl peroxide | 27% | Akzo Nobel | Thermal initiator |
| Modaflow | | | Cytec | Plasticizer |

Example 1

Comparative Representative of Prior Art EP 783 534

250 g of diphenyl methane-4,4'-diisocyanate and 0.1 g of dibutyl tin dilaurate and 1 g of trisnonyl phenyl phosphite were charged to a 1 liter round bottomed flask fitted with a thermometer, air sparge and an addition funnel. The contents were heated to 45° C. and 37 g of dipropylene glycol methylether were added and the temperature allowed to rise to 60° C. Then, 67.5 g of octadecanol was charged and the temperature raised to 110° C., at which temperature 0.5 g of hydroquinone was added. An air sparge was set at 1.5 l/hour and bubbled through the material while 116 g of hydroxyethyl acrylate was added over 1 hour while maintaining the batch temperature at 110° C. until the isocyanate value falls below 30 mg KOH/g. Then, 33.5 g of dipropylene glycol was charged and the batch temperature raised to 120° C. and held until the NCO value is lower than 30 ppm. The urethane acrylate was then discharged and allowed to cool. The material produced has a melting point of 101° C. and had a viscosity of 0.1 Pa.s at 125° C. This material is called Resin A.

Example 2

Invention 533.5 g of diphenyl methane-4,4'-diisocyanate and 1 g of trisnonyl phenyl phosphite (stabilizer) were initially introduced into a 1 liter three-necked flask fitted with a stirrer, thermometer and dropping funnel and heated to 80° C.

At 80° C., a mixture of 234 g of hydroxyl ethyl acrylate and 1.5 g of Butyl hydroxyl toluene were added drop wise in such a manner that the temperature did not exceed 90° C. The temperature was maintained at 80-90° C. until NCO value (weight percentage of NCO groups calculated as a MW of 42) of less than 11% was obtained.

161.8 g of fatty alcohol $C_{18-22}$: STENOL 1822 80 from Cognis were then added slowly in such a manner that the temperature did not exceed 90° C. The temperature was maintained at 90° C. for a further 3 h (hours) until the NCO value fell below 7%. 68 g of trimethylol propane were then added slowly in such a manner that the temperature did not exceed 90° C. On completion of addition, the reaction mixture was maintained at 80-90° C. until NCO value of less than 0.1% was obtained.

Once an NCO value of less than 0.1% had been obtained, the reaction mixture was poured into a flat aluminum dish and broken up once it had solidified. This material is called Resin B with melting point of 87-95° C. and viscosity at 120° C. of 1-1.4 Pa.s.

Example 3

Invention 384.5 g of hexamethylene diisocyanate trimer (HDT), 0.1 g of dibutyl tin dilaurate and 0.5 g of trisnonil phenyl phosphite were initially introduced into a 1 liter three-necked flask fitted with a stirrer, thermometer and dropping funnel and heated to 90° C.

At 90° C., a mixture of 73.9 g of hydroxyl ethyl acrylate and 0.5 g of Butyl hydroxyl toluene were added drop wise in such a manner that the temperature did not exceed 110° C. The temperature was maintained at 95-110° C. until NCO value of less than 12% was obtained (weight percentage of NCO groups calculated as a Mw of 42).

205.7 g of fatty alcohol $C_{18-22}$ were then added slowly in such a manner that the temperature did not exceed 110° C. The temperature was maintained at 90° C. for a further 3 h (hours) until the NCO value fell below 7%. 34 g of neopentyl glycol were then added slowly in such a manner that the temperature did not exceed 90° C. On completion of addition, the reaction mixture was maintained at 80-90° C. until NCO value of less than 0.1% was obtained.

Once an NCO value of less than 0.1% had been obtained, the reaction mixture was poured into a flat aluminum dish and broken up once it had solidified. This material is called Resin C with a melting point of 71-79° C. and viscosity at 120° C. of 1.8-2.2 Pa.s.

Example 4

Invention 384.5 g of hexamethylene diisocyanate trimer (HDT), 0.1 g of dibutyl tin dilaurate and 0.5 g of trisnonyl phenyl phosphite were initially introduced into a 1 liter three-necked flask fitted with a stirrer, thermometer and dropping funnel and heated to 90° C.

At 90° C., a mixture of 73.9 g of hydroxyl ethyl acrylate and 0.5 g of Butyl hydroxyl toluene were added drop wise in such a manner that the temperature did not exceed 110° C. The temperature was maintained at 95-110° C. until NCO value (weight percentage of NCO groups calculated as a MW of 42) of less than 12% was obtained.

205.7 g of fatty alcohol $C_{18-22}$ were then added slowly in such a manner that the temperature did not exceed 110° C. The temperature was maintained at 90° C. for a further 3 h (hours) until the NCO value fell below 7%. 34 g of isosorbide were then added slowly in such a manner that the temperature did not exceed 90° C. On completion of addition, the reaction mixture was maintained at 80-90° C. until NCO value of less than 0.1% was obtained.

Once an NCO value of less than 0.1% had been obtained, the reaction mixture was poured into a flat aluminum dish and broken up once it had solidified. This material is called Resin D with a melting point of 76-78° C. and viscosity at 120° C. of 2.6-2.8 Pa.s.

Extrusion and Application

Resin A, B, C or D were extruded with 0.5% of a thermal initiator as Novadelox 27, benzoyl peroxide and 2% of Moda-flow, at a screw speed of 200 rpm giving a residence time in the extruder of about 10 seconds. The temperature was maintained between 110 and 115° C. with the wall cylinder temperature between 120 and 125° C.

The final products have a gel time of about 3.5 minutes at 110° C. The resultant material was then ground and classified to less than 90 μm and electrostatically applied to a chromated aluminum test panel. The panel was then reflowed and cured in a fan assisted oven at 120° C. for 10 minutes to yield a film with a Koenig hardness of 80 according to ASTM D4366, DIN EN ISO 1522 and a methyl ethyl ketone swab resistance of more than 200 rubs.

Resin A, B, C or D are extruded with the rest of coating ingredients as shown in Table 2 at the extruder conditions shown in Table 3.

TABLE 2

Powder coatings formulations

| FORMULATION | A | B | C | D |
| --- | --- | --- | --- | --- |
| RESIN A | 555 | | | |
| RESIN B | | 555 | | |
| RESIN C | | | 555 | |
| RESIN D | | | | 555 |
| Irgacure 2959 | 5 | 5 | 5 | 5 |
| Irgacure 819 | 10 | 10 | 10 | 10 |
| BYK-360-P | 10 | 10 | 10 | 10 |
| CRAYVALLAC WF-1039 | 20 | 20 | 20 | 20 |
| TiO2 Kronos 2160 | 250 | 250 | 250 | 250 |
| Blanc Fixe Abr | 150 | 150 | 150 | 150 |

TABLE 3

Common extruder conditions for preparing the powder coating compositions

| Extruder | BUSS PCS-30 |
| --- | --- |
| Number of passes | 2 |
| Temperature (° C.) | 60 |
| Barrel Speed (rpm) | 150 |

The resultant materials were then ground and classified to less than 90 μm and electrostatically applied to MDF panels. The paints were reflowed and cured according to the conditions in Table 4 below:

TABLE 4

Common cure conditions

| IR lamp height | 74 |
| --- | --- |
| Time in the IR (s) | 80 |
| UV Bulbs | Hg/Ga |
| UV speed (m/min) | 3.4 |
| Total UV dose (mJ/cm$^2$) | 3400 |
| Substrate | MDF |

Yielding each one a film with the characteristics summarized in Table 5:

TABLE 5

Results

| Formulation | A | B | C | D |
| --- | --- | --- | --- | --- |
| Application load (g/m$^2$) | 175 | 207 | 198 | 200 |
| Aspect | Textured | Textured | Textured | Textured |

TABLE 5-continued

| Formulation | A | B | C | D |
|---|---|---|---|---|
| Adhesion (GT-val 0: Excel; 5: bad) | 1 | 1 | 0 | 0 |
| Pencil Hardness | 4H | 6H | 7H | 7H |
| MEK 100DR (0: Excel; 5: bad) | 0 | 0 | 0 | 0 |
| Gloss 20° (%) | 3 | 2.1 | 4 | 3.5 |
| Gloss 60° (%) | 12 | 11.8 | 23 | 18 |
| Gloss 85° (%) | 20 | 19 | 35 | 30 |
| L* | 93 | 93.2 | 95 | 94 |
| a* | −3.6 | −3.2 | −1.91 | −1.81 |
| b* | 13 | 12.9 | 2.32 | 2.22 |
| Y° | 19 | 18.7 | 3.2 | 3 |
| Processability (0: excellent; 5: bad) | 4 | 3 | 2 | 1 |

It is particularly shown from these comparative results that there is a significant improvement in terms of hardness with the use of a triol and in terms of hardness and processability and of yellowing (Y°) with the use of a tri-isocyanate.

The invention claimed is:

1. A powder resin with a melting point ranging from 60 to 110° C., and a particle size from 10 to 250 μm, comprising the reaction product of:
   a) an isocyanate component comprising at least one polyisocyanate with functionality of at least 2,
   b) an alcoholic component, comprising:
      b1) at least one polyol with OH functionality from 2 to 4,
      b2) a monoalcohol component comprising:
         b2.1) at least one monoalcohol, having at least one ethylenic unsaturation,
         b2.2) at least one saturated alcohol selected from the group of fatty alcohols, and optionally,
         b2.3) at least one additional saturated monoalcohol selected from the group of non fatty monoalcohols,
      the molar ratios of OH functional groups of said alcoholic components b2.2), b2.3) and b2.1) being defined so that the OH molar ratio of b2.2)/b2.1) or of [b2.2)+b2.3)]/b2.1) ranges from higher than 0.25 to 2, with the proviso that:
         the resulting said powder resin does having at least one urethane unit with branched structure resulting from the reaction of a polyisocyanate component a) with polyol component b1), with said component a) having an average functionality higher than 2 or otherwise if not higher than 2 with said component b1) having an average functionality higher than 2, and with
         the resulting resin having no any crosslinked structure and being soluble in at least one organic solvent.

2. The powder resin according to claim 1, wherein said urethane branched unit structure results from the reaction of at least one isocyanate a) having a functionality higher than 2.

3. The powder resin according to claim 1, said urethane unit results from the reaction of at least one polyol b1) having a functionality higher than 2.

4. The powder resin according to claim 2, wherein the said urethane branched unit structure results from the reaction of at least one isocyanate a) having a functionality higher than 2 with at least one polyol b1) having a functionality of 2.

5. The powder resin according to claim 3, characterized in that the said urethane unit results from the reaction of at least one polyol b1) having a functionality higher than 2, with a polyisocyanate a) having a functionality of 2.

6. The powder resin according to claim 1, wherein said polyol b1) is selected from at least one triol and/or tetrol and the said polyisocyanate a) is a diisocyanate or otherwise, the said polyol b1) is a diol and the said polyisocyanate is at least one tri or tetra-functional isocyanate, with the average functionality of the reactive groups from a) and b) (average functionality of a)+b)) being higher than 2 and with the proportions and functionalities and related conversions, of the said reactants a) and b) fulfilling the Macosko-Miller's relation.

7. The powder resin according to claim 1 wherein said polyol b1) has a functionality of 2 and is selected from isosorbide diol and with said isocyanate a) having a functionality higher than 2.

8. The powder resin according to claim 1 wherein the powder resin is a semi-crystalline powder resin.

9. The powder resin according to claim 1 wherein the following OH molar ratios are defined in said component b):
   b2.1)/b): 25-75%
   b2)/b): 50-90%
   b1)/b): 10-30%.

10. The powder resin according to claim 1 wherein said additional saturated alcohol b2.3) is equally present.

11. The powder resin according to claim 1 wherein said unsaturated monoalcohol b2.1) is selected from (meth)acrylic and/or vinylic and/or allylic monoalcohols.

12. The powder resin according to claim 1 wherein in addition to the reaction product of said components a) and b), the resin powder further comprises at least one second reaction product, which is different from the resin resulting from the reaction product of the said components a) and b).

13. The powder resin according to claim 12, wherein said at least second reaction product is an amorphous reactive resin, from a reactive composition a) and b) except that the said reactive composition is free from the monoalcohol component b2.2).

14. The powder resin according to claim 12 wherein said first resin resulting from the reaction product of components a) and b) is present in a weight content of 60 to 90% with respect to the total resin weight.

15. The powder resin according to according to claim 12 wherein the powder resin is obtained by a process comprising the following steps:
   i) preparation of a resin resulting from the reaction product of a reactive components a) and b),
   ii) addition of the reactive composition which is the precursor of the said second resin,
   iii) in situ post reaction of the reactive composition of step ii) in the presence of the resin of step i).

16. A powder coating composition wherein the powder coating composition comprises at least one powder resin with a melting point ranging from 60 to 110° C., and a particle size from 10 to 250 μm, comprising the reaction product of:
   a) an isocyanate component comprising at least one polyisocyanate with functionality of at least 2,
   b) an alcoholic component, comprising:
      b1) at least one polyol with OH functionality from 2 to 4,
      b2) a monoalcohol component comprising:
         b2.1) at least one monoalcohol, having at least one ethylenic unsaturation,
         b2.2) at least one saturated alcohol selected from the group of fatty alcohols, and optionally,
         b2.3) at least one additional saturated monoalcohol selected from the group of non fatty monoalcohols, the molar ratios of OH functional groups of said alcoholic components b2.2), b2.3) and b2.1) being defined so that the OH molar ratio of b2.2)/b2.1) or of [b2.2)+b2.3)]/b2.1) ranges from higher than 0.25 to 2, with the proviso that:

the resulting said powder resin does having at least one urethane unit with branched structure resulting from the reaction of a polyisocyanate component a) with polyol component b1), with said component a) having an average functionality higher than 2 or otherwise if not higher than 2 with said component b1) having an average functionality her than 2, and with the resulting resin having no any crosslinked structure and being soluble in at least one organic solvent.

17. The powder coating composition according to claim 16, wherein the powder coating composition is a paint or a varnish or a pigmented or non pigmented industrial coating and/or a pigmented or non pigmented architectural coating.

18. The powder coating composition according to claim 16 wherein the powder coating composition further comprises at least one free radical initiator system comprising at least one peroxide suitable for heat-curable coatings and/or at least one initiator suitable for radiation-curable coatings.

19. The powder coating composition according to claim 16 wherein the powder coating composition does not comprise any initiator system and it is curable by high energy radiation.

20. A coating wherein the coating is formed from curing of the powder coating composition according to claim 16.

21. The coating according to claim 20, wherein the coating is a paint or a varnish or a pigmented or a non-pigmented industrial and/or architectural coating.

22. The coating according to claim 21, wherein said industrial coating is protective anticorrosion coating suitable for metal or a protective coating for plastics and for wood or wood composites.

23. A coated substrate, wherein the substrate is coated with at least one coating according to claim 20, the said substrate being selected from: wood, wood composites, paper, cardboards, plastics, metal, synthetic composites or assemblies of them.

* * * * *